Nov. 24, 1953  N. INGERSOLL, JR  2,659,970
ARTIFICIAL INTRAORAL VENEER AND PROCESS OF PRODUCING
ANATOMICALLY COLORED AND CONTOURED
RESTORATIONS UTILIZING SAME
Filed Jan. 19, 1951  2 Sheets-Sheet 1
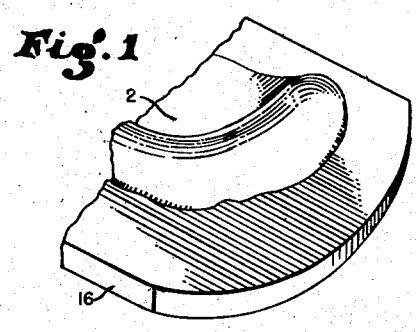
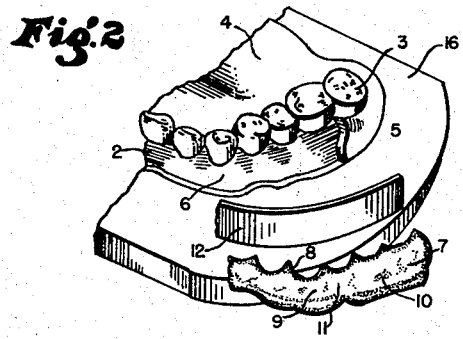
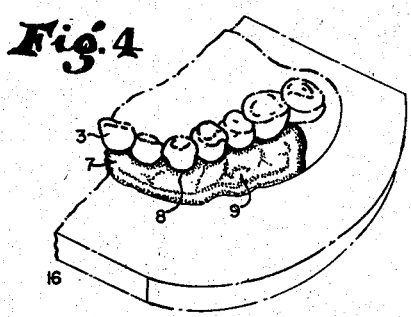
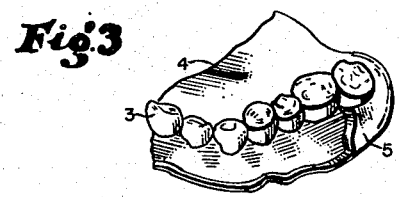
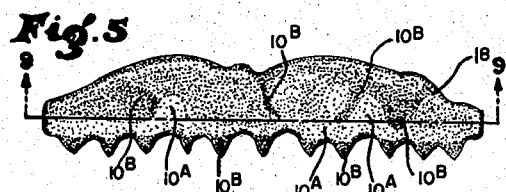
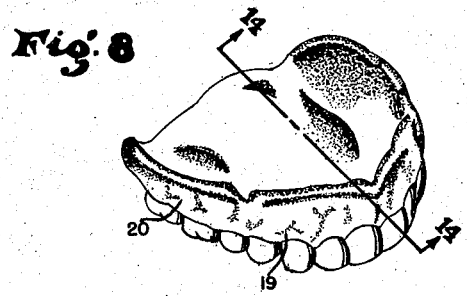
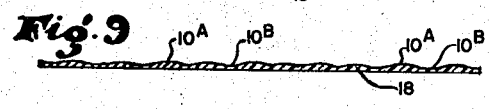
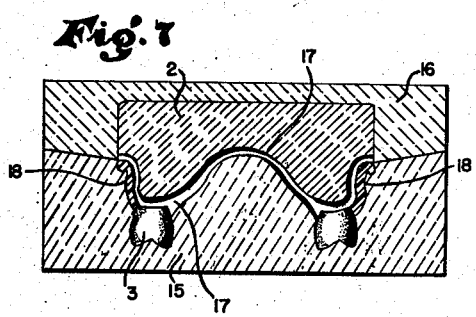
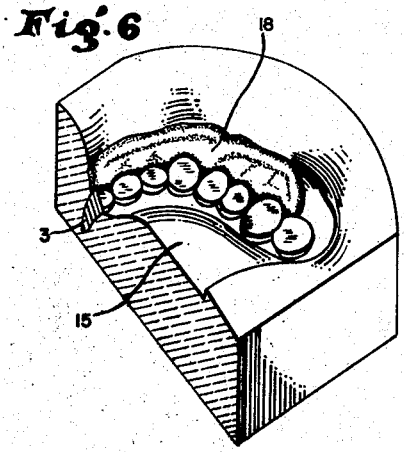
*INVENTOR.*
NELSON INGERSOLL, JR
BY
ATTORNEY Nov. 24, 1953       N. INGERSOLL, JR       2,659,970
ARTIFICIAL INTRAORAL VENEER AND PROCESS OF PRODUCING
ANATOMICALLY COLORED AND CONTOURED
RESTORATIONS UTILIZING SAME
Filed Jan. 19, 1951                    2 Sheets-Sheet 2
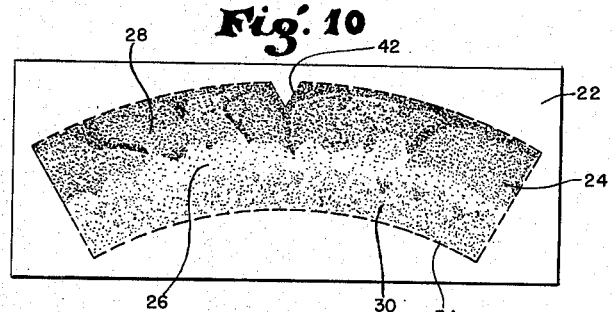
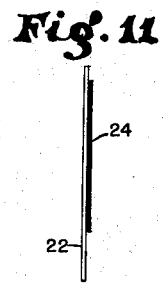
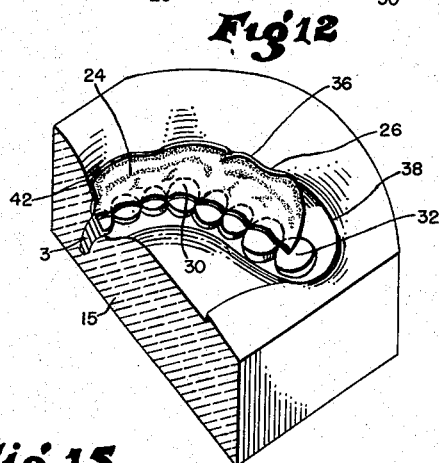
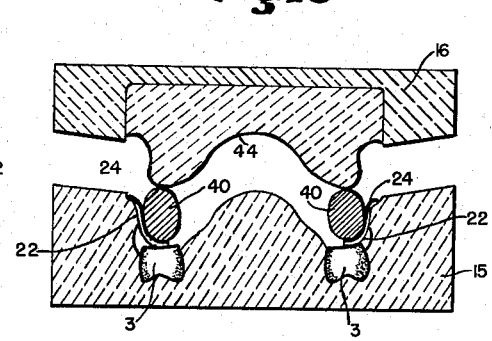
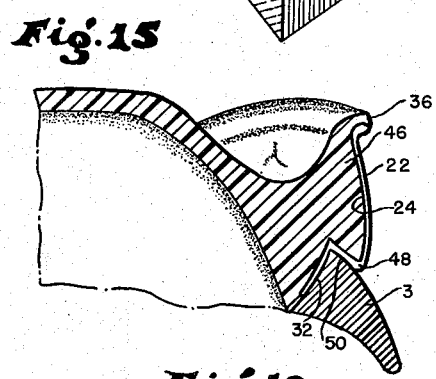
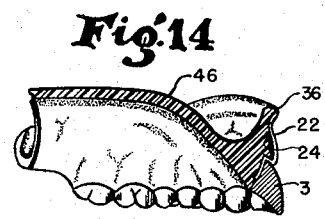
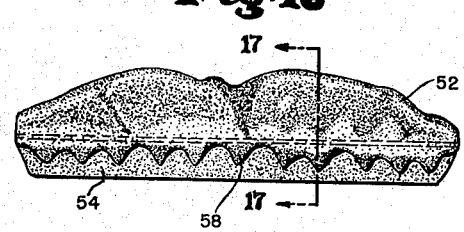
INVENTOR.
NELSON INGERSOLL. JR.
BY
ATTORNEY

UNITED STATES PATENT OFFICE 2,659,970

ARTIFICIAL INTRAORAL VENEER AND PROCESS OF PRODUCING ANATOMICALLY COLORED AND CONTOURED RESTORATIONS UTILIZING SAME

Nelson Ingersoll, Jr., York, Pa.

Application January 19, 1951, Serial No. 206,884

17 Claims. (Cl. 32—2)

This invention relates to intra-oral restoration veneers and to a process of producing anatomically colored and contoured replicas of natural gum tissues utilizing such veneers for the fabrication of intra-oral restorative devices or appliances.

The general object of the present invention is to provide intra-oral restorative veneers and a process of producing restorative devices and appliances by means of which an unskilled worker will be able to produce dentures of proper anatomical shape and color even though such worker has no knowledge of the proper anatomical shapes and colors for high quality dentures.

At present it is possible for highly skilled technicians to produce dentures which are so shaped and colored, particularly at the buccal and labial surfaces of such dentures, that they appear entirely natural. The production of such dentures necessitates special knowledge and technical skill on behalf of the technician and is a very long and laborious operation, the desired shapes of the labial and buccal surfaces having first to be carved in carefully by the technician and the desired colors have to be introduced by careful manipulation of colors in the process. The vast majority of dentures now produced are not correctly formed either as to shape or color, particularly the portion of the dentures which represent the gums around the teeth which are so poorly shaped and improperly colored that it is at once apparent, if the mouth of the wearer is opened sufficiently, that the wearer is employing a denture.

By means of the present invention I have provided certain denture veneers through the use of which high quality dentures may be produced by technicians who lack both the knowledge of the correct shape and color required in high quality dentures, and also lack the necessary skill to produce the same by the present methods.

The labial and buccal surfaces of the mouth which it is desired to reproduce in a quality denture fall within a limited number of typical varieties. Thus dentures may be classified as belonging to the ovoid, tapering or square type relative to alveolar angle in profile. By providing a limited number of sizes of each of these types it is possible to supply the technician with correctly shaped preformed strips which will enable the technician to produce in dentures the correct anatomical shape without the necessity of his using particular skill. Furthermore, the correct coloring of the labial and buccal surfaces can be provided in a limited number of typical varieties in the factory production of such denture veneers so that the technician may be supplied with a set of denture veneers sufficiently complete both as to anatomical shape and coloring that all he is required to do is to make a proper selection to suit the natural anatomical shape and coloring of a patient in question. Slight discrepancies which may exist between a factory produced denture veneer and a particular denture sought to be produced can be compensated for in the production of the denture which may be caused to yield slightly as the denture veneers are made of plastic or flexible material.

In accordance with the present invention different types of denture veneers are produced. One type of such veneers is employed in producing a pattern which is later to be used to form the denture mold. This type of veneer is required to be only anatomically shaped but does not require coloring. Such veneers can be readily produced of a great variety of materials, for example, a flexible plastic material, such as Vinylite. Another type of veneers are provided in accordance with the present invention which veneers are employed primarily to produce the natural color replica in the denture formed by the mold. These veneers become an integral part of the finally produced denture. This type of denture veneers will not only have correctly contoured surfaces to provide the correct anatomical shape, but also are colored and shaded. This second type of denture veneers can be made of any plastic or flexible material which can be united with and backed up by so-called denture base material to produce the final denture restoration. For example, where methyl methacrylate resin base material is to be employed in molding a restoration the denture veneers employed are strips made of methyl methacrylate resin in, however, a somewhat plastic state or incompletely cured condition.

Further, in utilizing said veneer strips wherein the color pattern varies and the color of the gingival areas of said strips particularly will differ from other areas thereof, the resins used to mold the denture base to back up the veneer strip may be furnished in a number of different monotones or shades and the base material to be used with any particular strip may be selected to correspond to the gingival area of said strip in order to eliminate any possibility of color lines of demarcation appearing in the gingival area of the finished restoration.

An alternative embodiment of said second type of denture veneer may also be used, the same being a strip of synthetic resinous material of substantially uniform thickness which may be either anatomically colored throughout its thickness or said strip may be transparent and have an anatomically colored replica superimposed on one surface thereof. This strip is also provided with an extension from the gingival area of the gum replica thereon and said extension is used as described hereinafter to prevent the occurrence of any color line of demarcation in the gingival area of the finished restoration in the event a base material of a color or shade differing from the gingival area of said replica is used.

A still further embodiment of the invention comprises the use of a strip which is provided with both an anatomical shape and color pattern simulating natural gum tissues which may be used not only to form the contour of the pattern and the corresponding mold made therefrom but which strip is also bondable with the denture base material in forming the finished restoration, said strip also being provided with an extension extending lingually from the gingival third for purposes of preventing any color line of demarcation in the event the base material is of a shade or color different from the gingival area of said strip.

These denture veneers may be employed by the technician in a simple process hereinafter described with the resultant production of high quality dentures of both correct and anatomical form and color without requiring either special knowledge or special skill by the technician. Moreover, through the use of such denture veneers the process of producing high quality dentures is enormously reduced in time and the cost of the resulting dentures likewise reduced.

The denture veneers of the present invention, together with the novel process of producing dentures of this invention which utilizes such veneers, will be completely understood from the following descriptions of preferred examples of the invention. The descriptions are given in connection with the accompanying drawings in which:

Fig. 1 is a perspective view illustrating a portion of a cast of a patient's mouth used in the process of the present invention;

Fig. 2 is a similar view of the cast showing in exploded fashion the components of a preliminary wax pattern including a filler strip and one of the veneer strips;

Fig. 3 is a fragmentary perspective view of part of the wax pattern and teeth addition applied to the cast of Fig. 1 in producing the form of Fig 2;

Fig. 4 is a similar view to Fig. 1 after the proper addition of one of the denture veneers of the present invention;

Fig. 5 is a plan view of another type of one of such denture veneers;

Fig. 6 is a fragmentary perspective view of a mold produced from the pattern, with one of the veneers of the present invention inserted in place in such mold;

Fig. 7 is a vertical section through two molding members prior to the introduction of denture base material therein;

Fig. 8 is a perspective view of a completed denture restoration;

Fig. 9 is a sectional view of one of the veneer strips taken on the line 9—9 of Fig. 5;

Fig. 10 is a plan view of another type of veneer strip of the present invention;

Fig. 11 is a side elevation of the strip shown in Fig. 10;

Fig. 12 is a sectional view of a mold having inserted therein a veneer strip of the types shown in Figs. 10 and 11 prior to the introduction of denture base material into the mold;

Fig. 13 is a sectional view taken on a plane transverse to the section shown in Fig. 12 and illustrating a mold and counterpart prior to the closing thereof and showing denture base material positioned in back of the veneer strip;

Fig. 14 is a cross-sectional view taken on the median line of a complete dental restoration embodying the type of veneer strip illustrated in Figs. 10 through 13;

Fig. 15 is a fragmentary sectional view similar to Fig. 14 but shown in a larger scale so as to illustrate more clearly details of the invention;

Fig. 16 is a plan view of still another type of veneer strip made in accordance with the present invention;

Fig. 17 is a sectional view of the veneer strip shown in and taken on the line 17—17 of Fig. 16.

The denture veneers of the present invention will be described in connection with a preferred example of the process of producing dentures embodying the present invention. Referring to the drawings, in the process of the present invention there is first produced a cast of a patient's mouth, which cast may be made in any usual or preferred manner. A half section of such a cast is indicated at 2 in Fig. 1 of the drawings and normally such casts are produced using dental investing materials such as, for example, special gypsum-containing casting plaster.

The next step in the process of producing dentures is illustrated in Fig. 2. In accordance with any usual or preferred technique there is selected a set of artificial teeth such as indicated at 3, which teeth are then attached to the cast 2 by the use of wax which, as indicated at 4, forms a base plate to simulate the palate of the mouth and lingual surface, a portion of the wax employed being extended around as indicated at 5, at the posterior or rear portion of the buccal surfaces, usually up to about the first molar area of the buccal surface. Differing from the usual practice, however, the wax is omitted from a portion of the buccal and labial surfaces as indicated at 6 for the purpose of permitting each portion of the pattern being produced to be formed through the use of the denture veneers of the present invention.

7 indicates one of a typical denture veneer of the present invention of the type used in producing the pattern. This denture veneer has one edge 8 serrated or contoured as indicated with a plurality of successive concave portions intended to simulate the gingival area of a natural gum line around a set of teeth, such as the set 3. The front surface 9 of such a denture veneer is shaped with undulations appearing as hills and dales as indicated at 10 and 11 to correspond with the natural protuberances and depressions in the labial and buccal surfaces of the gums over and between the roots of the teeth and terminating at the free margin of the gum in serrations 8. Fig. 4 illustrates how the portion of the surface 9 around each tooth (in an anatomically contoured denture) rises at the root lines of the teeth with valleys at points intermediate of the teeth. As the natural anatomical alveolar profile fall into three different types, the so-called ovoid, tapering and square type (or plus, minus, and vertical or zero) the natural type denture veneers indicated at 7 should be formed of a flexible and elastic material, such for example, as a mixture of wax and a suitable resinous material in order to permit the strips to be conformed to the area 6 of the wax pattern 4 having any of said alveolar profiles. While in the drawings we have shown the process as carried out on one-half of the pattern, it is to be understood that a complete cast and pattern are used in actual practice.

The denture veneers 7 are usually produced of average thickness of a few millimeters, such as 3, although because of the undulating hill and dale character of the front surface 9 thereof, the thickness will vary through the strip.

In using such a veneer 7 in forming the pattern it is first generally required that the labial and buccal surfaces of the cavity 6 be built up somewhat from the cast 2. For this purpose there may be used in the process of the present invention a number of plain, flat strips such as indicated at 12, which strips may be of any suitable plastic material and are usually provided in the form of strips about 1 millimeter in thickness, 10 millimeters in width, and 110 millimeters in length. Sufficient of such strips are attached to the cast 2 by the use of adhesive and to each other to bring the labial and buccal surfaces of the cast up to the point where they may be finished by the addition of the denture veneer 7. Then, as indicated in Fig. 4, the denture veneer 7 is placed in the cavity 6 and any deviation existing between the contour line 8 of the veneer and the shape of the set of teeth 3 selected for the denture is readily compensated for by the technician working the flexible strip against the teeth 3 until its gingival or gum line 8 correctly is in contact with the teeth 3, the flexible character of the strip permitting any slight stretching or compressing of the strip required to complete the pattern by forming an accurate anatomical contour on the buccolabial surface thereof. The lingual surface of the denture veneer 7 which is to the rear of the surface 9 may, in the process of manufacture, be provided with a suitable adesive or, if desired, such adhesive may be applied otherwise in the process of adding the denture veneer to the pattern.

By this portion of the process there has now been produced a complete pattern, which pattern possesses a correct anatomical shape of the buccal and labial surfaces without the technician being compelled to hand carve on wax such surfaces in accordance with the practice heretofore employed. Such pattern is then employed to form a mold in accordance with any usual or preferred technique. In the completion of such a mold the produced mold and counterpart are separated, the wax portions 4 and 5 are removed from the mold, likewise the strips 12 and the veneer 7, leaving only the teeth 3 of the pattern invested in the mold with the ridge laps and retentive areas exposed. In Figs. 6 and 7 such a mold is indicated, Fig. 6 showing a half section of the portion of the mold 15 which retains the artificial teeth 3 of the pattern, and 16 in Fig. 7 representing the counterpart of the mold. When the two mold members 15 and 16 are pressed together, as indicated in Fig. 7, there is a cavity 17 therebetween, in which cavity is to be produced the denture which will be attached to the teeth 3. At this step of the process, if desired, any usual technique may be employed in producing a denture, a finished denture being indicated in Fig. 8. In such a case the labial surfaces 19 of the denture, as well as certain of the buccal surfaces 20, will be correctly and anatomically shaped but they will lack the variation in color characteristic of natural surfaces.

Where such natural coloring is desired in the process of the present invention there is employed the second veneer strip such as indicated at 18 in Fig. 6. For each veneer strip 7 intended to be employed in the production of the pattern there should be provided an identically shaped veneer strip 18.

These anatomically contoured veneer strips are fabricated to not only impart desired anatomical shape thereto such as illustrated in Figs. 5 and 6 particularly but said strips are also provided with vari-colored anatomical replicas or patterns simulating natural gum tissue. Such color replicas or patterns may be formed in any one of a number of suitable ways such as by stenciling either with or without spray means; printing on the strip; or the colored pattern may be formed so as to extend substantially through the thickness of the strip. The latter may be achieved, for example, by depositing a resinous polymer pattern of suitably pigmented powder and then adding monomer to produce an anatomically colored gel-like strip. In addition, color patterns or replicas of natural gum tissues may be formed on a suitable base sheet by printing or otherwise and then transferred to one surface of the strip 18 by, for example, a decalcomania process. In instances where the strip 18 has a color pattern or replica on one surface only, the strip should be preferably substantially transparent. Still further, a color pattern or replica of natural gum tissues may be formed on the strip 18, for example, by printing respectively on a plurality of thin transparent resinous sheets separate color patterns comprising the primary color components of a composite vari-colored natural gum pattern. Said sheets are bondable with each other when superimposed so as to form such composite vari-colored natural gum pattern and the bonded sheets are also bondable with the base material from which the finished denture restoration is molded. In this instance, another layer of transparent resinous material having the anatomical contour of natural gum tissues on one surface is also bonded to the composite colored strips so as to form a protective layer thereon which will comprise the bucco-labial surface on the finished denture restroation.

Still another method of forming the strip 18 comprises, in lieu of the immediately aforementioned superimposed color pattern strips, utilizing a plurality of color pattern forming strips which are respectively colored a monotone of the three primary colors and the respective strips are transversely shaped to have variable thickness in order to produce varying intensity of color simulating a desired color pattern, whereby when said strips are superimposed on each other and bonded together, a desired vari-colored natural gum strip replica will be produced for addition to an outer transparent protective layer having suitable anatomical contour on one surface similar to the protective layer described in the immediately foregoing example.

In producing such natural colors and shades in the aforementioned patterns and replicas, a lighter and usually varied color will appear around the root eminences such as at 10A, while the papillae and the depressions between such eminences will be a darker shade and of varying color as indicated at 10B.

Denture veneers 18 should be made of a resinous material so that the serrated gingival edge of the veneers may yield sufficiently to conform accurately with the teeth 3 in the mold. The contour veneers 18 become a part of the finally produced denture restoration. Accordingly, they should be made of a material suitable for uniting with the base material used in molding the denture. For example, when methyl methacrylate resins are employed for producing the desired denture contour veneers 18 are likewise formed of methyl methacrylate or suitable resinous material bondable therewith.

Figs. 6 and 7 illustrate how, in practice of the process of the present invention, one of such denture veneers 18 is placed in the mold around the teeth. Thereupon sufficient denture base molding composition is added to fill the remaining portion of the cavity 17 illustrated in Fig. 7, the two molding members closed, and the mold and its contents subjected to the usual curing treatment.

As a result of this process a denture of the type illustrated in Fig. 8 is produced in which the veneer strip 18, provided with a preformed contour and color pattern or replica, becomes an integral part of the finished denture. By this process a denture is produced having bucco-labial surfaces the contour and coloring of which is entirely natural in appearance.

Another type of veneer strip embodying principles of the present invention is illustrated in plan view in Fig. 10 and in side elevation in Fig. 11. This strip comprises a sheet 22 of substantially transparent synthetic resinous material upon one surface of which is superimposed a color pattern or replica 24 simulating natural gum tissues in appearance. The strip 22 is relatively thin and, for example, of the order of about .025". The color pattern 24 illustrated in Fig. 11 is exaggerated in order to make the same visible in the drawing. Actually, this color pattern is much thinner than the strip 22. Said strip is formed of a resinous material such, for example, as an acrylic or a vinyl compound which is bondable with the resinous material from which the denture base is formed.

The color pattern may be superimposed upon one surface of the strip 22 by a number of methods such as; multi-color printing thereon to form a vari-colored pattern composed of the three primary colors, or by a stenciling process either with or without spraying, or by forming a desired vari-colored replica on a backing sheet and then transferring said replica or pattern to the strip 22 by a decalcomania process. Further, the strip 22 may be provided with a photo-sensitive coating on one surface and said coating may be exposed to a desired negative to develop in said coating an anatomically colored pattern or replica simulating natural gum tissues.

The color pattern 24 also comprises relatively lighter tinted areas 26 which ultimately form the gingival areas disposed adjacent the teeth in the finished denture restoration. The pattern, as in the strip 18 illustrated in Fig. 5, has generally darker color areas 28 which will be disposed on the areas of the denture restoration in the vicinity of the peripheral border of said restoration for example. Said pattern also comprises an extension 30 which is preferably colored approximately a monotone corresponding to the lighter tinted areas 26 for reasons to be described. Therefore, this extension 30 may be referred to as a gingival extension.

In forming a denture restoration utilizing the strip 22, a mold 15 is formed by a process described hereinbefore in connection with utilizing previously described strips, said mold having the teeth 3 invested therein so that the gingival necks and ridge laps 32 and other retentive areas are exposed in the mold. The bucco-labial forming surface of the cavity of mold 15 is provided with desired anatomical contour in a manner similar to that described relative to Figs. 2, 3, and 4 concerning the use of strip 7. Thus, the mold cavity surface will impart the desired bucco-labial anatomical contour to the finished denture. The strip 22 which is in a flexible and readily pliable, uncured state is used to impart a desired anatomical vari-colored pattern to the bucco-labial surface of the finished denture restoration.

One of said strips is approximately trimmed along the dotted line 34 and the trimmed strip is placed in the mold as shown in Figs. 12 and 13, whereby the gingival extension 30 is disposed so as to at least cover a substantial portion of the ridge laps 32 of the teeth as clearly shown in these figures. After the strip 22 is introduced into the mold, the portion thereof which will form the peripheral margin 36 is pressed against the edge 38 of the cavity in mold 15 to impress into one surface of the strip 22 a line defining the peripheral margin of the strip. The strip is then temporarily removed from the mold cavity and trimmed. In placing the strip 22 in the mold cavity the surface thereof opposite that having the color pattern thereon is placed against the surface of the mold cavity, whereby the color pattern 24 is uppermost in the mold as viewed in Fig. 13.

In the preferred technique, a plurality of rolls or balls of denture base material 40 are formed and are placed against the color pattern 24 of the strip 22 and manually pressed so as to preliminarily conform or adapt the flexible strip 22 to the contour of the buccal and labial forming surfaces of the mold cavity. Such pressure will also serve to conform the gingival extension 30 to the ridge laps and retentive areas of the teeth and thereby said extension 30 serves in the capacity of a barrier or dam to prevent the passage of the base material 40 down into the mold cavity portions which will form particularly the interdental papillae. The color pattern 24 is also preferably provided with a notch 42 to function as a reference point for centering the strip 22 in the mold.

The final molding of the denture now takes place by placing the counterpart 16 of the mold against the balls of dough-like denture base material 40 as shown in Fig. 13. Pressure is then applied to counterpart 16 to cause the lingual and palatal forming surfaces 44 thereof to cooperate with the opposed complementary surfaces in the cavity of mold 15 in order to spread the balls of base material 40 and distribute them throughout the cavity 17 in the mold as illustrated in Fig. 7 in connection with one of the previously described embodiments so as to form the completed denture restoration. It is understood of course that the balls of base material 40 will blend homogeneously during such molding so that no lines of demarcation are formed. It is also to be understood that the above described operation may include one or more trial closures of the mold to determine whether or not the base material 40 completely fills the cavity 17 and, if necessary, additional material may be added until the operator is certain that the cavity is filled with such material in accordance with customary practice.

During such final molding, the base material 40, in being forced against the color pattern surface of the strip 22, disposes the strip into exact conformity with the surface of the cavity in the mold 15 and including those areas of the cavity which form the interdental papillae projecting between adjacent teeth. Due to the aforementioned function of the gingival extension 30 of the strip 22 none of the base material will be visible on the buccal or labial surfaces of the finished denture restoration except at the peripheral margin thereof where it will be unnoticed in normal use. Thereby the color pattern imparted to the finished denture restoration by embodiment of a strip 22 as aforesaid results in complete control of the visible areas of the bucco-labial surfaces of the restoration which are visible during use.

After the denture has been cured in accordance with conventional practice while in the assembled mold and counterpart, the mold parts are removed from the completed denture restoration in accordance with conventional practice. The surfaces of the denture restoration are then finished by buffing and the like to impart the usual desirable lustre thereto and the thickness of the transparent strip 22 which has now been integrally bonded to the molded base material comprises a protective layer over the likewise bonded color pattern 24. The thickness of the strip 22 is adequate to permit a reasonable amount of buffing during the aforementioned finishing operations without risking physical engagement of the color pattern 24 and the transparency of the strip 22 readily permits the pattern 24 to show therethrough to present the desired anatomical vari-colored pattern to simulate natural gum tissues as well as having the desired anatomical contour. Further, the finished strip portion of the denture restoration also protects the color pattern from normal intra-oral fluids and abrasive actions such as occur during mastication and cleansing.

The finished denture restoration made in accordance with the last described process is illustrated in profile section in Fig. 14 and, in order to better illustrate the structure and relationship of the strip 22 as bonded to the denture base 46, Fig. 15 represents an enlarged fragmentary sectional view of the denture shown in Fig. 14. However, Fig. 15 is used primarily to illustrate the aforementioned relationship rather than to show the exact anatomical contour which will be imparted to the bucco-labial surface of the denture restoration by the aforementioned process. In Fig. 15, which is a sectional view through one of the anterior teeth, the strip 22 extends over the denture base 46 to form the labial surface thereof, the normal gingival roll 48, and then conforms to the gingival neck 50 of the anterior teeth 3 and the ridge lap 32. The color pattern or replica 24 is disposed between the inner surface of strip 22 and the denture base 46 as is clearly shown in Fig. 15 wherein replica 24 is represented merely by a line due to the thinness thereof.

In dentures where the teeth 3 are formed from resinous material similar to or bondable with the strip 22 and denture base 46, a chemical bond will be formed between said teeth 3, base 46 and strip 22 during the above described curing operation. However, where the teeth 3 are, for example, formed from porcelain or resinous material which is dissimilar to the resinous material of strip 22 and denture base 46 so as not to be bondable therewith, the teeth may be secured to the denture base 46 and strip 22 by any suitable mechanical means such, for example, as undercut areas in the teeth, metal pins, or the like. Also, the pigment carrier or vehicle of the replica pattern 24 is preferably compatible with the denture base material 46 and the strip 22 so as to bond to the molded denture base 46 and the strip 22 during the curing thereof in the mold.

A still further embodiment of veneer strip may be used in the form illustrated in Figs. 16 and 17, the latter merely being a sectional view of the former. This veneer strip 52 is formed from suitable synthetic resinous material which is capable of being molded to impart desired anatomical contour thereto similar to that provided on strips 7 and 18 described above. The veneer strip 52 may be used in lieu of the strip 7 to form a pattern from which the mold 15 is made. However, when the wax pattern 4 is removed from the mold following its formation, the strip 52 is not removed from the mold as in the case of the strip 7 in the above described processes but the strip 52 is retained in the mold while the denture base material 40 is added thereto for purposes of forming a finished denture restoration. The strip 52 is provided with an anatomical color pattern similarly to the strip 18, said pattern being formed thereon by any of the methods described above in regard to strip 18. The strip 52 is also bondable with the base material 40 during the curing of the molded denture restoration so that the denture base 46 and the strip 52 which comprises the bucco-labial surface thereof will be integrally bonded thereto.

In order to prevent passage of any of the base material 40 between the strip 52 and the teeth 3 during the molding of the denture restoration, a barrier in the form of a ridge lap extension 54 projects from the lingual surface 56 of the strip 52. When the pattern 4 is being formed from which the mold 15 is made, the extension 54 is inserted in the wax between the crest of the ridge of the cast 2 and the ridge lap surfaces 32 of the teeth 3. When the denture base material 40 is added to the mold cavity, it is applied against the extension 54 to press the same into firm engagement with the ridge lap areas of the teeth and thereby obstruct the passage of the base material 40 to the bucco-labial surfaces of the teeth or the spaces therebetween into which the papillae simulating projections 58 of strip 52 extend. During the final molding of the denture restoration, the pressure of the base material 40 against the strip 52 and extension 54 will force the papillae projections 58 into the interstices in the mold cavity between the gingival necks of the teeth and the final curing will firmly set the strip 52 and bond it to the denture base 46 which backs up the strip in the completed denture restoration. As explained in connection with the foregoing descriptions of Fig. 14 and the attachment of the teeth 3 to the finished denture restoration, either chemical or mechanical bonds will be formed between the teeth and the denture base 46, depending upon the composition of the teeth; the strip 52 however being chemically bonded to said base 46.

It will thus be seen that the foregoing invention provides a process for forming an anatomically contoured and vari-colored artificial denture restoration simulating natural gum tissues and such restoration may be formed by utilizing one of a number of different gum strips embodying similar principles, the process being readily susceptible to being performed by unskilled operators to quickly and accurately fabricate such denture restorations.

While the invention and the various items and features thereof have been illustrated and described in their preferred embodiments, it is to be understood that the invention is not to be limited to the precise details herein illustrated and described since the same may be carried out in other ways, falling within the scope of the invention as claimed.

This application is a continuation-in-part of my application Serial No. 126,998, filed November 14, 1949, now abandoned.

I claim:

1. A denture veneer strip formed from substantially transparent synthetic resinous material bondable to an artificial intra-oral restoration, said strip having on one surface thereof a vari-colored replica simulating vari-colored natural gum tissues.

2. A denture veneer strip formed from substantially transparent synthetic resinous material bondable to an artificial intra-oral restoration, said strip having a vari-colored replica simulating vari-colored natural gum tissues visible through said strip.

3. A denture veneer strip comprising a plurality of thin substantially transparent resinous sheets having disposed therebetween a color pattern simulating at least a portion of vari-colored natural gum tissue visible through at least one of said sheets, said sheets being bondable with each other when superimposed and also bondable to an artificial intra-oral restoration.

4. A denture veneer strip of substantially uniform thickness and formed from substantially transparent synthetic resinous material bondable to an artificial intra-oral restoration, said strip having on one surface thereof a vari-colored replica simulating vari-colored natural gum tissues.

5. A denture veneer strip formed from substantially transparent material of the class of acrylic and vinyl resinous compounds and bondable to an artificial intra-oral restoration, said strip being curable to a firm condition and having on one surface thereof a vari-colored replica simulating vari-colored natural gum tissues.

6. A denture veneer strip formed from substantially transparent methyl methacrylate and bondable to an artificial intra-oral restoration, said strip being curable to a firm condition and having on one surface thereof a vari-colored replica simulating vari-colored natural gum tissues.

7. A denture veneer strip formed from a substantially transparent copolymer of vinyl chloride and vinyl acetate and bondable to an artificial intra-oral restoration, said strip being curable to a firm condition and having on one surface thereof a vari-colored replica simulating vari-colored natural gum tissues.

8. A denture veneer strip formed from synthetic resinous material bondable to an artificial intra-oral restoration, said strip having on one surface thereof a vari-colored replica simulating vari-colored natural gum tissues and a portion of said strip extending beyond said replica of gum tissues and comprising a gingival extension.

9. A denture veneer strip formed from substantially transparent synthetic resinous material bondable to an artificial intra-oral restoration, said strip having on one surface thereof a vari-colored replica simulating vari-colored natural gum tissues and a portion of said strip extending beyond said replica of gum tissues to comprise a gingival extension.

10. A denture veneer strip formed from synthetic resinous material bondable to an artificial intra-oral restoration, said strip having on one surface thereof a vari-colored replica simulating vari-colored natural gum tissues, a portion of said strip extending beyond said replica of gum tissues to comprise a gingival extension and colored similarly to the portions of said gum tissue replica immediately adjacent said gingival extension.

11. A denture veneer strip formed from synthetic resinous material bondable to an artificial intra-oral restoration, said strip having on one surface thereof a colored replica simulating vari-colored natural gum tissues and a portion of said strip not less than approximately one third the vertical dimension thereof in use extending beyond said replica of gum tissues to comprise a gingival extension.

12. A denture veneer strip formed from substantially transparent synthetic resinous material bondable to an artificial intra-oral restoration, said strip having a color pattern simulating vari-colored natural gum tissues superimposed on one surface of said strip and the other surface of said strip having undulations formed therein to simulate a natural gum contour.

13. A denture veneer strip formed from substantially transparent synthetic resinous material bondable to an artificial intra-oral restoration, said strip having one surface substantially flat and a color pattern simulating vari-colored natural gum tissues superimposed on said one surface of said strip, the other surface of said strip being undulated to simulate a natural gum contour.

14. A denture veneer strip formed from substantially synthetic resinous material bondable to an artificial intra-oral restoration and having a color pattern simulating vari-colored natural gum tissues, one surface of said strip being substantially flat and the other surface thereof being undulated to simulate a natural gum contour, and a gingival extension projecting at an angle from the flat surface of said strip adjacent the gingival area thereof, the thickness of said gingival extension being less than the average thickness of said strip.

15. A process of producing an anatomically contoured and vari-colored intra-oral restoration comprising, forming a mold having a prescribed anatomical contour including a bucco-labial surface and artificial teeth mounted therein with the ridge laps and other retentive areas exposed, placing within said mold against the bucco-labial forming surface thereof one surface of a synthetic resinous veneer strip, said strip having thereon a vari-colored pattern simulating vari-colored natural gum tissues, bending one edge of said strip against said retentive areas of the teeth in such manner as to provide extensive contact between said one surface of said strip and said retentive areas and to form a pocket in the other surface of said strip adjacent said teeth, whereby said strip forms a barrier to prevent flow of moulding material between said strip and said teeth, forcing said strip into conformity with said bucco-labial forming surface of said mold by placing within said mold against the other surface of said veneer strip molding material bondable with said veneer strip, and molding by heat and pressure said material and veneer strip within said mold to bond together the same and thereby form a completely hardened and cured intra-oral restoration having a desired anatomical contour and a vari-colored pattern on the bucco-labial surface thereof simualting natural vari-colored gum tissues.

16. A process of producing an anatomically contoured and vari-colored artificial denture comprising, forming a mold having artificial teeth mounted therein with the ridge laps and retentive areas thereof exposed and said mold also having a prescribed anatomical contour including a bucco-labial surface, placing within said mold against the bucco-labial forming surface thereof one surface of a flexible uncured synthetic resinous veneer strip having thereon a vari-colored pattern simulating vari-colored natural gum tissues and a gingival extension, disposing said gingival extension over said ridge lap areas of said teeth, placing within said mold against the other surface of said veneer strip and covered ridge lap areas molding material bondable with said veneer strip, and molding by heat and pressure said material and veneer strip with its gingival extension within said mold to cure and bond together the same and thereby form an artificial denture having a desired anatomical contour and a vari-colored pattern on the bucco-labial surface thereof simulating natural vari-colored gum tissues.

17. A process of producing an anatomically contoured and vari-colored artificial denture comprising forming a mold having artificial teeth mounted therein with the ridge laps and retentive areas exposed and said mold also having a prescribed anatomical contour including a bucco-labial surface, placing within said mold against the bucco-labial forming surface thereof one surface of a flexible uncured synthetic resinous veneer strip having a vari-colored pattern visible through said strip and simulating vari-colored natural gum tissues, said strip also having along one edge an aera defining a gingival extension, disposing said gingival extension over said ridge laps and retentive areas of said teeth, introducing into said mold against the other surface of said veneer strip and covered ridge lap areas and retentive areas molding material bondable with said veneer strip, and molding said material and veneer strip within said mold while heated and under pressure to cure and bond together the same and thereby form an artificial denture having a desired anatomical contour and a vari-colored pattern visible on the bucco-labial surface thereof simulating natural vari-colored gum tissues.

NELSON INGERSOLL, JR.

References Cited in the file of this patent

UNITED STATES PATENTS

| Number | Name | Date |
|---|---|---|
| 88,228 | Streeter | Mar. 23, 1869 |
| 644,583 | Doyle | Mar. 6, 1900 |
| 810,184 | Broadbent | Jan. 16, 1906 |
| 1,585,348 | Hick et al. | May 18, 1926 |
| 1,750,810 | Miller | Mar. 18, 1930 |
| 2,234,993 | Vernon et al. | Mar. 18, 1941 |
| 2,367,767 | Gale | Jan. 23, 1945 |
| 2,423,330 | Levine | July 1, 1947 |
| 2,520,265 | Warren | Aug. 29, 1950 |
| 2,551,812 | Nelson | May 8, 1951 |